US012558195B2

(12) United States Patent
Zhang et al.

(10) Patent No.: US 12,558,195 B2
(45) Date of Patent: Feb. 24, 2026

(54) SCANNING BODY

(71) Applicant: Shining 3D Tech Co., Ltd., Zhejiang (CN)

(72) Inventors: Wei Zhang, Zhejiang (CN); Xiaobo Zhao, Zhejiang (CN); Xiaojun Chen, Zhejiang (CN); Jianfu Jiang, Zhejiang (CN); Xiaopeng Fu, Zhejiang (CN)

(73) Assignee: SHINING 3D TECH CO., LTD., Zhejiang (CN)

( * ) Notice: Subject to any disclaimer, the term of this patent is extended or adjusted under 35 U.S.C. 154(b) by 0 days.

(21) Appl. No.: 19/191,740

(22) Filed: Apr. 28, 2025

(65) Prior Publication Data

US 2025/0352307 A1 Nov. 20, 2025

(30) Foreign Application Priority Data

May 20, 2024 (CN) ......................... 202410627543.X

(51) Int. Cl.
*A61C 8/00* (2006.01)
*A61C 9/00* (2006.01)
(52) U.S. Cl.
CPC ............ *A61C 8/0001* (2013.01); *A61C 9/004* (2013.01)
(58) Field of Classification Search
CPC ........................ A61C 8/00–0098; A61C 9/004
See application file for complete search history.

(56) References Cited

U.S. PATENT DOCUMENTS

| | | | |
|---|---|---|---|
| 9,968,424 B1* | 5/2018 | Kulick | A61C 8/0068 |
| 2014/0113252 A1* | 4/2014 | Hung | A61C 9/004 |
| | | | 433/201.1 |
| 2014/0205969 A1* | 7/2014 | Marlin | A61C 8/0068 |
| | | | 433/196 |

(Continued)

FOREIGN PATENT DOCUMENTS

| | | |
|---|---|---|
| CN | 113229970 A | 8/2021 |
| CN | 117243630 A | 12/2023 |
| JP | 2018507760 A | 3/2018 |

(Continued)

OTHER PUBLICATIONS

The first office action of counterpart JP application No. 2025078744 was issued on Jul. 29, 2025.

(Continued)

*Primary Examiner* — Yogesh P Patel
(74) *Attorney, Agent, or Firm* — Scully, Scott, Murphy & Presser, P.C.

(57) ABSTRACT

A scanning body is provided. The scanning body includes a scanning body positioning portion provided with an inner cavity. A first fastener is provided in the inner cavity. The first fastener includes a stopper portion and a fastening portion. The bottom of the scanning body positioning portion is provided with a mounting hole for the fastening portion to pass through. The bottom of the scanning body positioning portion is in limiting fit with the stopper portion along an extending direction of the inner cavity. The fastening portion passes through the mounting hole and is configured for connecting to an implant; and the inner cavity passes through the top end of the scanning body positioning portion for allowing a user to operate the first fastener.

17 Claims, 6 Drawing Sheets

(56)         References Cited

U.S. PATENT DOCUMENTS

2014/0377714 A1   12/2014  Jahn
2018/0000566 A1*   1/2018  Jahn ..................... A61C 8/0001

FOREIGN PATENT DOCUMENTS

JP          2018538014  A    12/2018
JP          2019217138  A    12/2019
KR           102181295  B1   11/2020
WO          2023041700  A1    3/2023

OTHER PUBLICATIONS

The EESR of counterpart EP application No. 25173048.7 was issued on Sep. 25, 2025.

* cited by examiner

SCANNING BODY

CROSS-REFERENCE TO RELATED APPLICATION(S)

The disclosure claims the priority to Chinese Patent Application No. 202410627543.X filed with the Chinese Patent Office on May 20, 2024, which is incorporated herein in its entirety by reference.

FIELD

The disclosure relates to the field of intraoral implantation technology, and in particular, to a scanning body.

BACKGROUND

For edentulous arch intraoral implantation, most current methods use traditional impression-taking techniques and digital impression scanner common scanning body techniques. The traditional impression-taking techniques are cumbersome in steps and time consuming, while in the existing digital impression scanner common scanning body techniques, a scanning body generally includes a positioning portion, and the positioning portion is fixed to an implant by a fastener. The current scanning body has the following drawbacks, including: limited features, the fastener easily falling off during assembly, the scanning body positioning portion easily rotating when the scanning body is mounted, and limitations in manufacturing processes and materials. Therefore, there are many deficiencies.

SUMMARY

Some embodiments of the disclosure provide a scanning body, so as to solve at least one problem arising from most current methods that use traditional impression-taking techniques and digital impression scanner common scanning body techniques.

Some embodiments of the disclosure provide a scanning body, including:

a scanning body positioning portion, wherein the scanning body positioning portion is provided with an inner cavity, and a first fastener is provided in the inner cavity; the first fastener includes a stopper portion and a fastening portion; a bottom of the scanning body positioning portion is provided with a mounting hole for the fastening portion to pass through; the bottom of the scanning body positioning portion is in limiting fit with the stopper portion along an extending direction of the inner cavity; the fastening portion passes through the mounting hole and is configured for connecting to an implant; and the inner cavity passes through a top end of the scanning body positioning portion for allowing a user to operate the first fastener.

In an embodiment, the scanning body positioning portion is provided with an anti-disengagement structure for preventing the first fastener from falling out of the inner cavity.

In an embodiment, the anti-disengagement structure includes a circular protrusion provided on a wall of the inner cavity and protruded inward from the wall of the inner cavity or a plurality of protrusions arranged in a ring shape; and/or the anti-disengagement structure is provided on a positioning top of the scanning body positioning portion.

In an embodiment, the wall of the inner cavity limits the first fastener along the extending direction of the inner cavity; or the bottom of the scanning body positioning portion is provided with a limiting hole for limiting fit with the implant.

In an embodiment, a first preload member is provided between the stopper portion and the bottom end of the scanning body positioning portion, and the first preload member is sleeved on the outer wall of the fastening portion.

In an embodiment, the first preload member is limited between the stopper portion and the bottom end of the scanning body positioning portion along the extending direction of the inner cavity.

In an embodiment, the scanning body positioning portion includes a positioning base and a positioning top, and the positioning base and the positioning top are separably connected; or the positioning base and the positioning top are integrally formed.

In an embodiment, the positioning base and the positioning top are separately connected, and the separate connection between the positioning base and the positioning top is formed by interference fit, threaded fit, or snap fit; and/or the separate connection between the positioning base and the positioning top is an irreversible mounting connection.

In an embodiment, the scanning body marking portion is provided on the scanning body positioning portion and extends laterally outward from the scanning body positioning portion, the scanning body marking portion has an upper surface, and the upper surface is provided with markings at different heights.

In an embodiment, the upper surface includes a plurality of upper surfaces, the plurality of upper surfaces being at different heights, or the upper surface is inclined; and/or, the scanning body marking portion has a stepped structure, wherein a step top surface of the stepped structure and a step bottom surface of the stepped structure form the upper surface of the scanning body marking portion, and the markings are provided on the step top surface and the step bottom surface; and/or the markings includes marking points.

Compared with the related art, the embodiments of the disclosure have the following beneficial effects: by configuring the bottom of the scanning body positioning portion to be in limiting fit with the stopper portion along the extending direction of the inner cavity, a new method of combining the scanning body positioning portion and the first fastener is provided; and by limiting the stopper portion of the first fastener in the inner cavity along the extending direction of the inner cavity, the fastener is prevented from falling off during the assembly process.

Reference signs: 1—positioning top, 11—anti-disengagement structure, 2—first fastener, 21—stopper portion, 22—fastening portion, 3—first preload member, 4—positioning base, 401—first inner cavity, 402—second inner cavity, 41—first fastener accommodating cavity, 42—fitting shaft, 43—mounting hole, 44—scanning body mounting cavity, 5—scanning body marking portion, 51—marking main portion, 52—second fastener, 53—second preload member, 511—step top surface, 512—step bottom surface, 5111, 5121—marking, 6—inner cavity.

SUMMARY

In order to make the technical problem to be solved, the technical solution and the beneficial effects of the disclosure clearer and more comprehensible, the disclosure will be further described in detail below in conjunction with the accompanying drawings and embodiments. It should be understood that specific embodiments described herein are merely used to explain the disclosure, but are not intended to limit the disclosure.

It should be noted that when an element is referred to as being "fixed to" or "provided on" another element, the element may be directly on the other element or indirectly on the other element. When an element is referred to as being "connected to" another element, it can be directly connected to the other element or indirectly connected to the other element.

It should be understood that, orientation or position relationships indicated by terms such as "length", "width", "up", "down", "front", "back", "left", "right", "vertical", "horizontal", "top", "bottom", "inside", and "outside" are orientation or position relationships based on the accompanying drawings, which are only used to facilitate description of the disclosure and simplify the description, and do not indicate or imply that the device or element referred to must have a specific orientation, or be constructed and operated in a specific orientation, and therefore cannot be construed as limitations to the disclosure.

In addition, terms such as "first" and "second" are used herein for purposes of description and are not intended to indicate or imply relative importance or significance or to imply the number of indicated technical features. Thus, a feature defined by "first" and "second" may explicitly or implicitly include one or more of the features. In the description of the disclosure, "a plurality of" means two or more than two, unless specified otherwise.

The disclosure aims to solve at least one problem that occurs in most current methods using traditional impression-taking techniques and digital impression scanner common scanning body techniques.

Figure 1A:
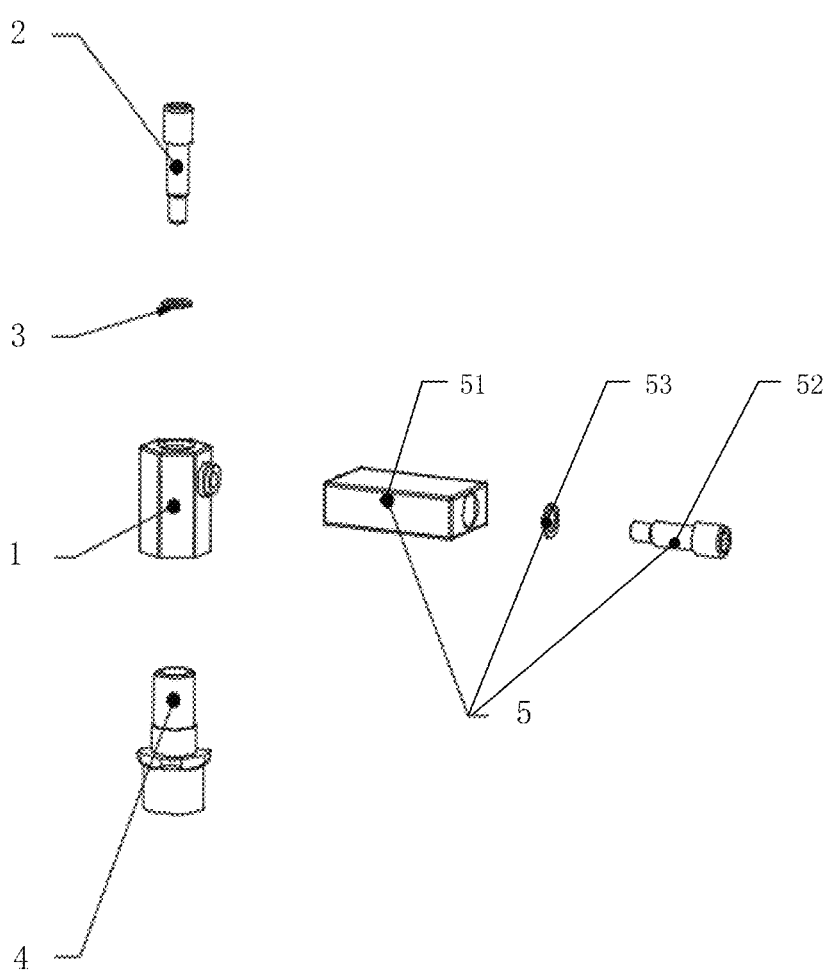
FIG. 1A is a schematic diagram of the exploded structure of a scanning body according to an embodiment of the disclosure.
Figure 1B:
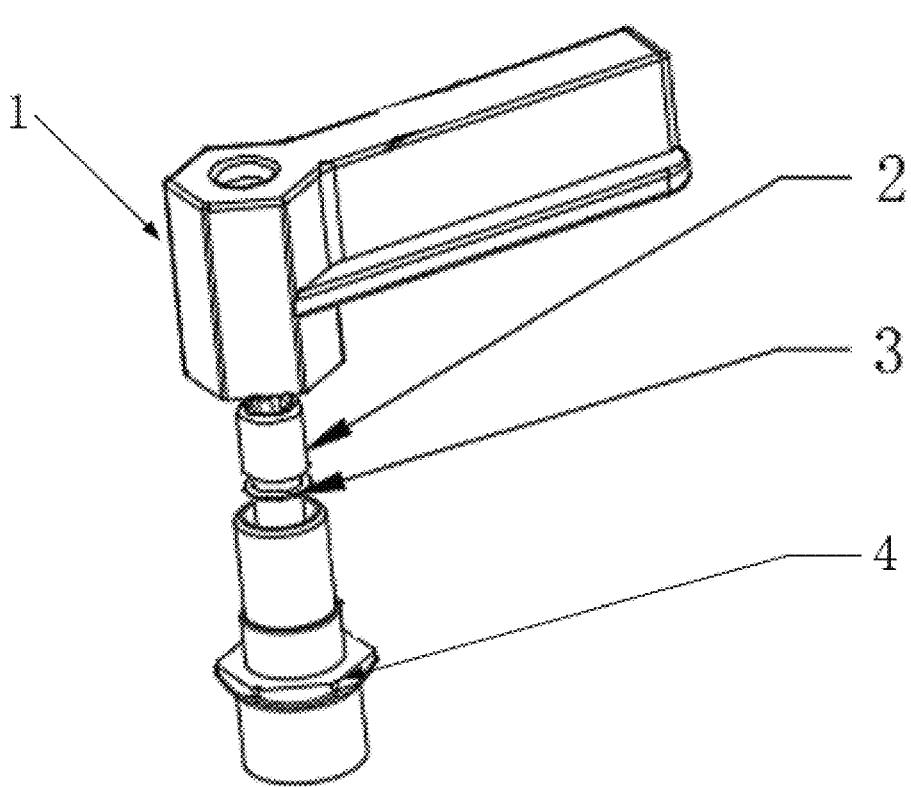
FIG. 1B is a schematic diagram of the assembly structure of a scanning body according to an embodiment of the disclosure.
Figure 3:
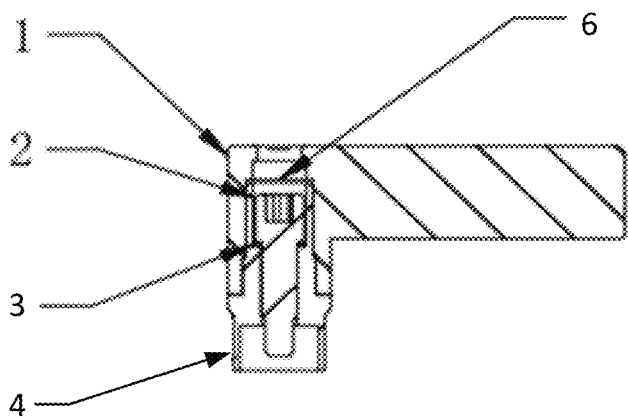
FIG. 3 is a cross-sectional view of the assembled scanning body according to an embodiment of the disclosure.

In an embodiment, in order to facilitate understanding of the disclosure, the embodiment of the disclosure firstly provides a basic structure of an intraoral scanning body. FIG. 1A shows a schematic diagram of the exploded structure of a scanning body according to an embodiment of the disclosure. FIG. 1B shows a schematic diagram of the assembly structure of a scanning body according to an embodiment of the disclosure. FIG. 3 is a cross-sectional view of the assembled scanning body according to another embodiment of the disclosure. The scanning body includes a scanning body positioning portion; the scanning body positioning portion includes a positioning top 1 and a positioning base 4; and the positioning top 1 and the positioning base 4 form the scanning body positioning portion. The scanning body positioning portion has an inner cavity 6, a first fastener 2 is provided in the inner cavity 6, and the first fastener 2 is able to move in the inner cavity 6 along the extending direction of the inner cavity 6. One end of the first fastener 2 passes through the bottom of the positioning base 4 and is fixedly connected to an implant (not shown in the figure), and the other end of the first fastener 2 is in limiting fit with the bottom of the positioning base 4, thereby connecting and fixing the scanning body to the implant.

It should be noted that the other end of the first fastener 2 being in limiting fit with the bottom of the positioning base 4 structurally means that the other end of the first fastener 2 may not pass through the bottom of the positioning base 4, such that the positioning base 4 is fixed on the implant through the first fastener 2.

Figure 4A:
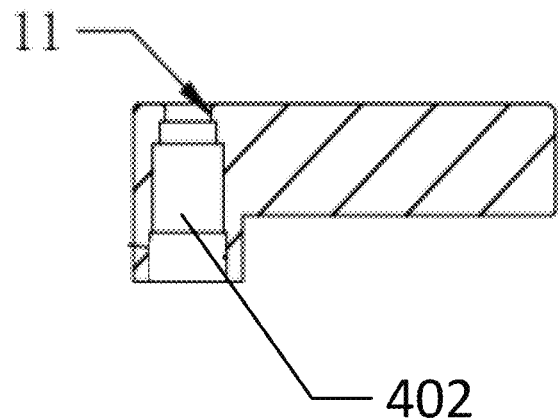
FIG. 4A is a schematic diagram of a positioning top according to an embodiment of the disclosure.
Figure 4B:
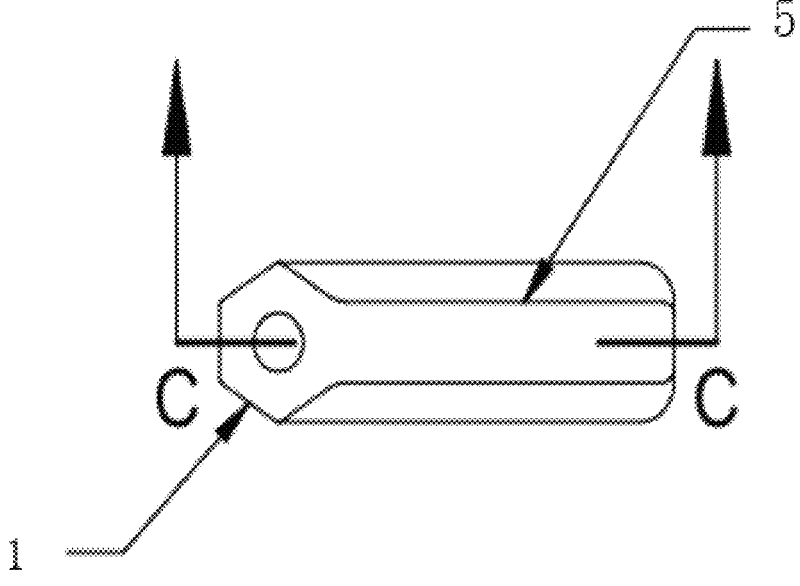
FIG. 4B is a top view of a positioning top according to an embodiment of the disclosure.
Figure 5:
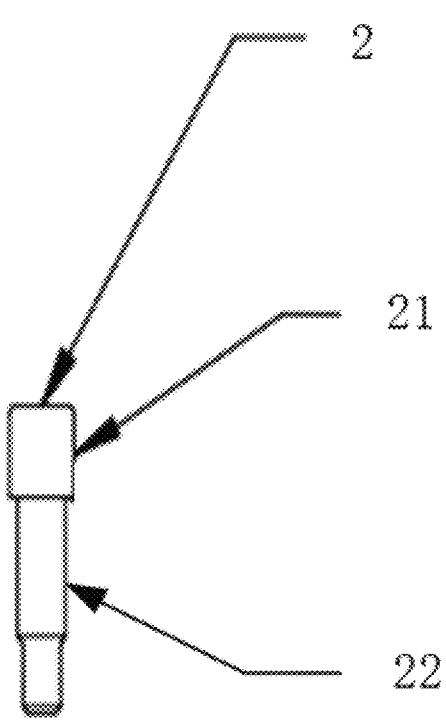
FIG. 5 is a schematic diagram of the structure of a fastener according to an embodiment of the disclosure.

It should be understood that the other end of the first fastener 2 being in limiting fit with the bottom of the positioning base 4 in the disclosure specifically means that the other end of the first fastener 2 is limited at the bottom of the positioning base 4 and may not pass through the bottom. Since the top of the positioning base 4 is above the bottom of the positioning base 4, in some embodiments, the other end of the first fastener 2 is limited at the top of the positioning base 4; and these embodiments also belong to "the other end of the first fastener 2 being in limiting fit with the bottom of the positioning base 4". As shown in FIGS. 2B and 4A, the inner cavity 6 of the scanning body positioning portion is divided into a first inner cavity 401 of the positioning base 4 and a second inner cavity 402 of the positioning top 1. As shown in FIG. 5, the first fastener 2 includes a stopper portion 21 and a fastening portion 22. The fastening portion 22 passes through the mounting hole 43 and connects to the implant (for example, threaded connection). The first inner cavity 401 includes the mounting hole 43, and the stopper portion 21 is limited in the second inner cavity 402, such that the stopper portion 21 and the fastening portion 22 may work together to fix the scanning body on the implant.

Figure 2A:
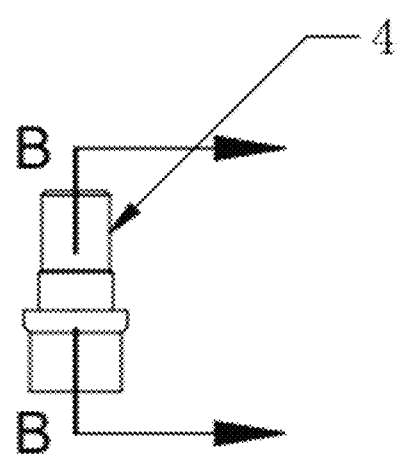
FIG. 2A is a front view of a positioning base according to an embodiment of the disclosure.
Figure 2B:
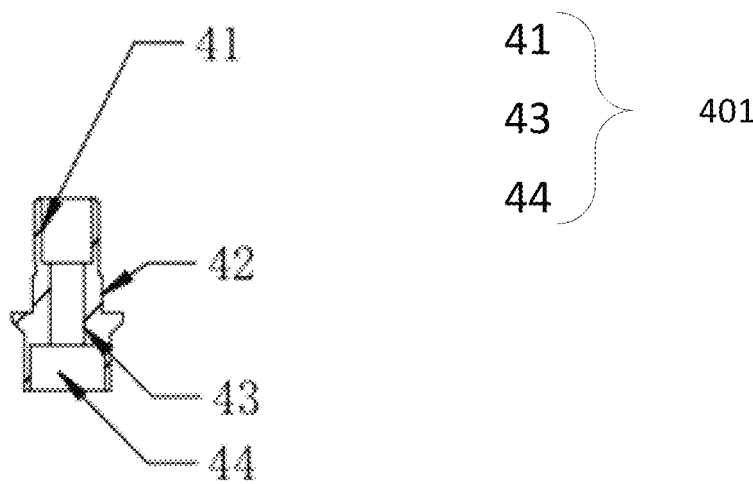
FIG. 2B is a cross-sectional view of a positioning base according to an embodiment of the disclosure.

FIG. 2A and FIG. 2B further illustrate the internal positional relationship of the first fastener 2 with the positioning top 1 and the positioning base 4. FIG. 2A is a front view of a positioning base according to an embodiment of the disclosure. FIG. 2B is a cross-sectional view of a positioning base according to an embodiment of the disclosure. As shown in FIGS. 2A and 2B, the first inner cavity 401 of the disclosure includes a first fastener accommodating cavity 41, a mounting hole 43 and a scanning body mounting cavity 44. The fitting shaft 42 of the positioning base 4 is assembled into the second inner cavity 402 of the positioning top 1, such that the positioning base 4 is assembled with the positioning top 1 and the first inner cavity 401 is in communication with the second inner cavity 402 to form the inner cavity 6. It can be determined from the figures that the inner diameter of the first fastener accommodating cavity 41 is larger than the inner diameter of the mounting hole 43, and the inner cavity wall of the first fastener accommodating cavity 41 and the inner cavity wall of the mounting hole 43 form a stepped structure. Thus, the stopper portion 21 of the first fastener 2 may be limited by the stepped structure in the first fastener accommodating cavity 41 and the second cavity 402 of the positioning top 1, so as to achieve that "the stopper portion of the first fastener 2 is in limiting fit with the bottom of the positioning base 4." Of course, the disclosure may also include other limiting structures, which are not enumerated here.

It can be determined that in the embodiment of the disclosure, the first fastener 2 is limited by the wall of the inner cavity 6 along the extending direction of the inner cavity 6, such that the first fastener 2 may move in the inner cavity 6, and the scanning body positioning portion is combined with the implant by operating the first fastener 2. It should be understood that, in the embodiment of the disclosure, the extending direction of the inner cavity 6 is from top to bottom or from bottom to top as shown in FIG. 1B, that is, the "vertical" direction, which is not described herein again.

Further, in the embodiment of the disclosure, the scanning body mounting cavity 44 is a limiting hole provided at the bottom of the scanning body positioning portion for limiting fit with the implant, the inner diameter of the scanning body mounting cavity 44 is larger than the inner diameter of the mounting hole 43, and the inner cavity wall of the scanning body mounting cavity 44 and the inner cavity wall of the mounting hole 43 form a stepped structure, such that the implant may be limited in the scanning body mounting cavity 44 by the stepped structure.

In specific use, the positioning base 4 of the scanning body needs to be fixed to the implant, thereby fixing the scanning body on the implant for performing internal oral scanning.

It should be noted that the scanning body positioning portion is columnar in shape, which may be cylindrical or hexagonal prism.

In an embodiment, the scanning body positioning portion is provided with a scanning marking portion, the scanning marking portion extends laterally outward from the scanning body positioning portion, and the surface of the scanning marking portion is provided with markings.

The innovations in different aspects of the disclosure based on the described structure will be described in detail below.

1. Anti-Falling Structure

In order to prevent the first fastener 2 from falling off the top of the scanning body, referring to FIGS. 1-4B, the embodiment provides a scanning body, including a scanning body positioning portion, wherein the scanning body positioning portion is provided with an inner cavity 6, and a first fastener 2 is provided in the inner cavity 6; the first fastener 2 includes a stopper portion 21 and a fastening portion 22; the bottom of the scanning body positioning portion is provided with a mounting hole 43 for the fastening portion 22 to pass through; the bottom of the scanning body positioning portion is in limiting fit with the stopper portion 21 along the extending direction of the inner cavity 6; the fastening portion 22 passes through the mounting hole and is configured for connecting to an implant; the inner cavity 6 passes through the top end of the scanning body positioning portion for allowing a user to operate the first fastener 2; and the scanning body positioning portion is provided with an anti-disengagement structure 11 for preventing the first fastener 2 from falling out of the inner cavity. It should be noted that the inner cavity 6 includes the mounting hole 43, and the extending direction of the inner cavity 6 is the axial direction of the mounting hole 43, i.e. the mounting direction of the first fastener.

According to the overall structure of the scanning body and the description of the connections between various components, the scanning body positioning portion is provided with the inner cavity 6, the bottom of the scanning body positioning portion is in limiting fit with the stopper portion 21 along the extending direction of the inner cavity 6, and then the first fastener 2 is completely built in the inner cavity 6 through the anti-disengagement structure 11, such that the first fastener is prevented from falling off, and the problem of inconvenient carrying and easy loss caused by the separation of the first fastener 2 from the scanning body is solved.

It should be understood that, in the embodiment of the disclosure, the bottom of the scanning body positioning portion is the bottom of the positioning base 4, which will not be described in detail in the disclosure.

In an embodiment, the anti-disengagement structure 11 is provided at in the top end area of the positioning top 1, and the anti-disengagement structure 11 may prevent the first fastener 2 from falling off the positioning top.

In an embodiment, the anti-disengagement structure 11 of the disclosure is formed by the top wall of the inner cavity 6, in another embodiment, the anti-disengagement structure 11 of the disclosure is assembled on the top wall of the inner cavity 6, thereby preventing the first fastener 2 from falling off by limiting the first fastener 2.

Exemplarily, the anti-disengagement structure of the disclosure includes a circular protrusion provided on the wall of the inner cavity and protruded inward from the wall of the inner cavity or a plurality of protrusions arranged in a ring shape.

In an embodiment, the anti-disengagement structure 11 is a protruding circular protrusion, and the protruding circular protrusion is provided at the top of the second inner cavity 402 near the positioning top 1 to prevent the first fastener 2 from falling off the top of the positioning top 1.

In another embodiment, the anti-disengagement structure 11 is a plurality of protruding points, the plurality of protruding points are arranged at equal intervals around a full circle, and the plurality of protruding points are provided at the top of the second inner cavity 402 near the positioning top 1, effectively preventing the first fastener 2 from falling out of the second inner cavity 402 of the positioning top 1.

In an embodiment, as shown in FIG. 3, the anti-disengagement structure 11 in the embodiment of the disclosure is formed by a reduction in diameter of the inner cavity 6, that is, the diameter of the stopper portion 21 of the first fastener 2 is configured to be larger than the inner diameter of the anti-disengagement structure 11, thereby achieving the anti-falling function.

In an embodiment, the scanning body further includes an elastic deformation part, the elastic deformation part is arranged at one of the anti-disengagement structure 11 and the first fastener 2, and the other one of the anti-disengagement structure 11 and the first fastener 2 anti-falling fits with the elastic deformation part. After the elastic deformation part is deformed under the action of an external force, the anti-falling fit is able to be released, and the first fastener 2 is able to be taken out from the scanning body.

In an embodiment, the elastic deformation part is an O-ring, the O-ring is provided in the circumferential direction of the first fastener, and the O-ring is axially limited to the anti-disengagement structure 11 without being deformed, the O-shaped ring is able to release the axial limitation when being deformed under the action of the external force, and passes through the anti-disengagement structure 11. In another embodiment, the elastic deformation part is provided on the anti-disengagement structure 11, the first fastener 2 anti-falling fits with the elastic deformation part.

It should be noted that, when the elastic deformation part is under the action of the external force, deformation may occur; however, after the external force is removed, the elastic deformation part is able to be completely restored to the original shape and size. In an embodiment, after the elastic deformation part is deformed by the external force, the first fastener is able to be fitted to the scanning body or removed from the scanning body, when the elastic deformation part is not subjected to the action of the external force, the elastic deformation part returns to the original shape and size, and the first fastener and the scanning body achieve a limiting fit via the elastic deformation part, the first fastener is located in the scanning body without falling off.

In an embodiment, the circular protrusion or the plurality of protrusions is the elastic deformation part.

It can be determined that the anti-disengagement structure 11 of the disclosure may effectively prevent the first fastener 2 from falling out of the second inner cavity 402 of the positioning top 1, avoiding the problem that the assembling operation of the scanning body onto an implant abutment in the oral cavity is inconvenient due to the first fastener 2 falling off. Of course, the configuration of the anti-disengagement structure 11 in another embodiment may also be other structures, as long as they achieve the limiting and anti-falling effect, which is not specifically limited herein.

It should be noted that, in this embodiment, the stopper portion 21 not only may effectively prevent the first fastener 2 from falling off the positioning top 1, but also may facilitate the operation (tightening or loosening) of the first fastener 2 by avoiding the anti-disengagement structure 11, which will not be described in detail herein.

According to the anti-disengagement structure of the intraoral scanning body provided in this embodiment, the top end of the positioning top 1 of the scanning body is in limiting fit with the stopper portion 21 along the extending direction of the inner cavity 6, and when the positioning top 1 and the positioning base 4 are combined, the first fastener 2 may be fully enclosed in the inner cavity 6; and the anti-disengagement structure 11 is further configured to prevent the first fastener 2 from falling out of the inner cavity 6, thereby solving the problem that the assembling operation of the scanning body onto the implant abutment in the oral cavity is inconvenient due to the first fastener 2 falling off.

2. Pre-Tightening Anti-Rotation Structure

In order to prevent the scanning body from rotating during assembly, the present embodiment provides a pre-tightening anti-rotation structure of the scanning body. In an embodiment, with reference to FIGS. 1A-5, the scanning body positioning portion of the disclosure is provided with the inner cavity 6; the first fastener 2 is provided in the inner cavity 6; the first fastener 2 includes a stopper portion 21 and a fastening portion 22; the bottom of the scanning body positioning portion is provided with the mounting hole 43 for the fastening portion 22 to pass through; the bottom of the scanning body positioning portion is in limiting fit with the stopper portion 21 along the extending direction of the inner cavity 6; the fastening portion 22 passes through the mounting hole and is configured for connecting to the implant; the inner cavity 6 passes through the bottom of the scanning body positioning portion; the inner cavity 6 passes through the bottom of the scanning body positioning portion along the extending direction thereof for allowing a user to operate the first fastener 2; a first preload member 3 is provided between the stopper portion 21 and the bottom of the scanning body positioning portion; and the first preload member 3 is sleeved on the outer wall of the fastening portion 22.

In an embodiment, when the scanning body is mounted, the scanning body is fixed to the implant by mounting the first fastener 2, and the first fastener 2 is assembled to the implant body through spiral rotation (the two are in threaded connection). At this time, due to the presence of the first preload member 3, rotational cushioning is provided, which may prevent the scanning body from rotating along with the first fastener.

As shown in FIG. 2B, the first fastener 2 is mounted in the mounting hole 43 of the positioning base 4 through the first preload member 3, and the first fastener 2 passes through the bottom of the positioning base 4 through the first inner cavity 401 and is fixed to the implant.

In this embodiment, the first preload member 3 is an integrally connected ring-shaped structure. In an embodiment, the first preload member 3 is a washer, and in another embodiment, the first preload member 3 is another type of ring-shaped intermediate piece either with or without an opening, which is not specifically limited herein.

It should be understood that, the configuration of the first preload member 3 of the disclosure is able to form a scanning body structure together with the described anti-disengagement structure, or is able to independently form a scanning body structure on the basis of this concept, which is not limited herein. The pre-tightening anti-rotation structure of the disclosure may prevent the scanning body from rotating during assembly.

3. Separate Mounting Structure

In order to solve the current problems of limited manufacturing process and material for the scanning body and the built-in requirement of the first fastener, the embodiment provides a separate scanning body. The positioning base 4 and the positioning top 1 of the scanning body in the present embodiment are configured separately.

In the embodiment, the positioning base 4 and the positioning top 1 are able to be formed of different materials due to the separate configuration, allowing them to better adapt to different oral environments and the spatial position of an implant rod, thereby meeting the requirements for optimal scanning scenarios.

In addition, when the positioning base 4 and the positioning top 1 are mounted separately, it facilitates for the built-in of the first fastener 2 in the inner cavity 6; and in combination with the anti-disengagement structure 11, the first fastener 2 is limited in the inner cavity 6, preventing the first fastener 2 from falling out during assembly and use.

In an embodiment, the positioning top 1 is subjected to a black surface treatment, and is made of an aluminum alloy material, which is suitable for the formation of marking points; and the positioning base 4 is made of a stainless steel material. The hardness of the positioning base 4 is higher than that of the positioning top 1, making it suitable for fixing with the implant. The first fastener 2 is made of a metal material with fatigue-resistant properties. Further, the positioning top 1 and the positioning base 4 which are separately connected are made through different manufacturing processes, thus eliminating limitations on the manufacturing process. This expands the range of process and material options for the positioning top 1 and positioning base 4, thereby solving the problem in the current integrated forming solution where it is difficult to form the marking points while ensuring hardness, or where ensuring the formation of marking points compromises hardness.

In the embodiment of the disclosure, the separate connection between the positioning base 4 and the positioning top 1 is formed by interference fit, threaded fit or snap fit.

In an embodiment, an interference fit is formed by limiting the size of the connecting aperture. In another embodiment, a threaded fit is achieved by forming corresponding internal and external threads on the surfaces of the positioning base 4 and positioning top 1. Therefore, the separate connection in the disclosure may be represented structurally, and the separate connection may be structurally distinguished from the integral connection.

It should be understood that, the described separate connection in the disclosure is able to be a reversible connection, that is, it is disassembled and reconnected. In other embodiments of the disclosure, the separate connection between the positioning base and the positioning top is an irreversible mounting connection, that is, it is not be disassembled after connection, which is not limited in the disclosure. In the disclosure, irreversible mounting is preferred to ensure the rigid state of the scanning body and ensure stability.

4. Scanning Body Marking Portion

In order to solve the problem of limited scanning body features in common scanning body techniques, the present embodiment provides a scanning body structure. The scanning body provided by the embodiment of the disclosure further includes a scanning body marking portion 5, wherein the scanning body marking portion 5 is provided on a scanning body positioning portion and extends laterally outward from the scanning body positioning portion, and the scanning body marking portion 5 has an upper surface, and the upper surface is provided with markings at different heights.

In this embodiment, the upper surface of the scanning body marking portion 5 is provided with markings at different heights to create spatial marking points, such that the scanning body positioning portion may achieve three-dimensional positioning, thereby increasing the spatial distribution dimension of the markings, and improving the accuracy of positional recognition after scanning. In addition, the markings at different heights may be the same or different, increasing the variety of features and further enhancing positioning accuracy. The markings are distributed on the upper surface, facilitating scanning by the scanner and reducing the need for adjustments to the scanning angle of the scanner.

Figure 6A:
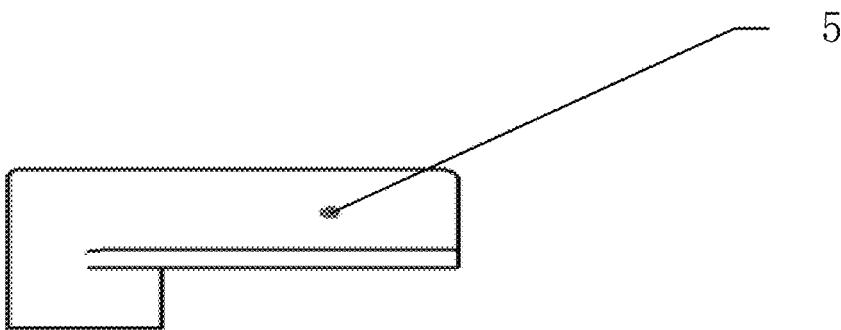
FIG. 6A is a front view of a scanning body marking portion according to an embodiment of the disclosure.
Figure 6B:
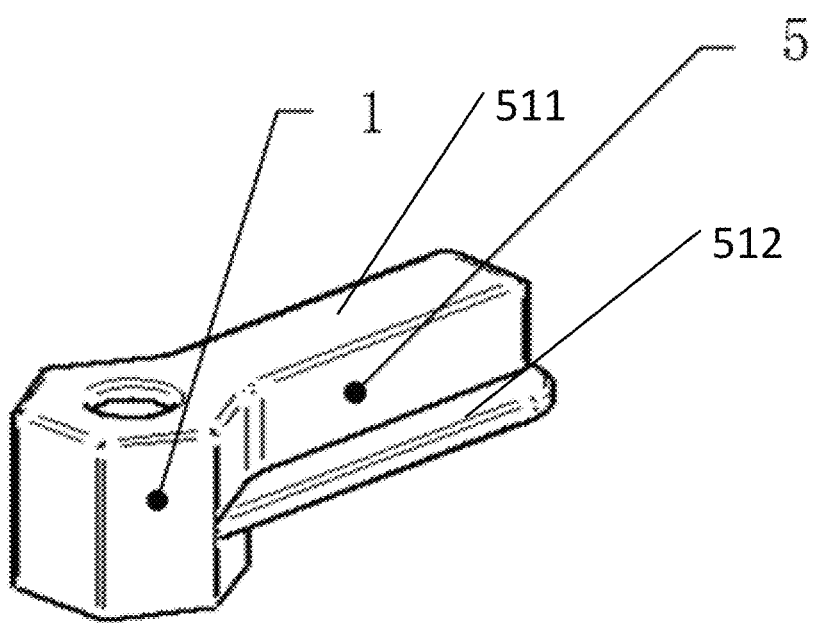
FIG. 6B is a schematic diagram of the structure of a scanning body marking portion according to an embodiment of the disclosure.
Figure 7:
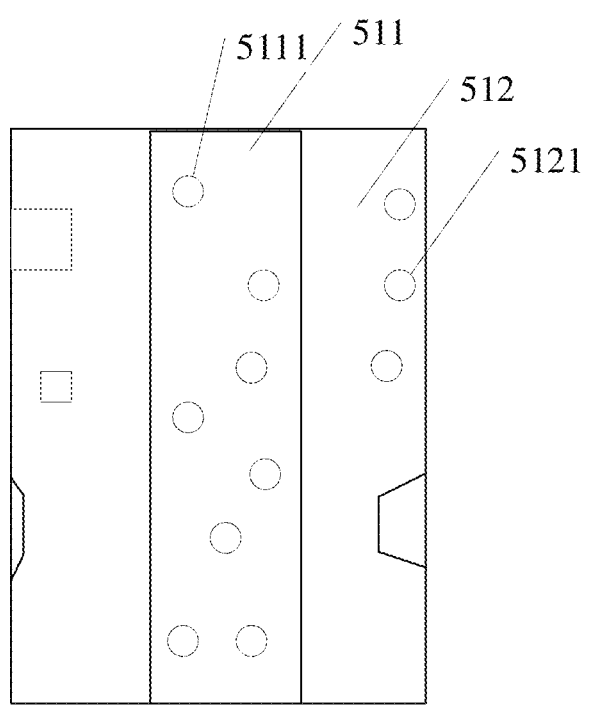
FIG. 7 is a top view of a scanning body marking portion according to an embodiment of the disclosure.

In the embodiment of the disclosure, as shown in FIGS. 6A, 6B and 7, the scanning body marking portion 5 has a stepped structure. In this way, a step top surface 511 and a step bottom surface 512 form two upper surfaces at different heights, and markings are provided on these two upper surfaces at different heights, such that the markings have different heights.

In this embodiment, since the markings at different heights are formed, the scanner may acquire three-dimensional distributed marking points by scanning the upper surface. That is, the scanning of a single surface is sufficient to capture the three-dimensional distribution of the spatial markings without the need to adjust the scanning angle of the scanner. The disclosure improves scanning accuracy by utilizing marking points with a three-dimensional distribution, and at the same time, the distribution of marking points in different dimensions may better constrain the accuracy of collected data.

Further, in the embodiment of the disclosure, the markings may be marking points, or encoding points, or other geometric shapes, which is not limited in the disclosure.

In the embodiment of the disclosure, as shown in FIG. 7, the step top surface 511 is provided with markings 5111 and the step bottom surface 512 is provided with markings 5121. The markings may be feature points or feature shapes, such as circular and triangular. The markings may include one or more, which is not limited in the disclosure.

In an embodiment not shown in the figure, the scanning body marking portion 5 is shaped as a polyhedron, and each face of the polyhedron is not in the same plane, such that the scanning body marking portion 5 includes a plurality of upper surfaces at different heights, and the markings are formed on each of the plurality of upper surfaces. In an embodiment, the shape is hexagonal, and different faces are able to be configured for making spatial marking points. This is advantageous for the easy making of spatial marking points and helps improve the accuracy of spatial positioning of the scanning body positioning portion.

In addition, in other embodiments, the upper surface of the scanning body marking portion 5 of the disclosure is an inclined surface, such that markings of different heights are formed on the inclined surface.

In other embodiments, the upper surface of the scanning body marking portion 5 of the disclosure is a curved surface, such that markings of different heights are formed on the curved surface. In an embodiment, the curved surface is a curved surface with a smooth change in curvature.

Further, in the embodiment of the disclosure, the shape of the markings on the scanning body marking portion 5 of each scanning body is the same or different.

With continued reference to FIG. 1A, in an embodiment, the scanning body marking portion 5 includes a marking main body 51 and a second fastener 52, the marking main body 51 is connected to the positioning top 1 through the second fastener 52, and the second fastener 52 is in limiting fit with the end of the marking main body 51 near the positioning top 1. The markings are provided on the surface of the marking main body 51.

In an embodiment, the scanning body marking portion 5 includes a third inner cavity, and the second fastening member 52 passes through the third inner cavity and is in limiting fit with the positioning top 1.

In addition, the scanning body provided in the disclosure further provides a second preload member 53 corresponding to the second fastener 52. As shown in FIG. 1A, the scanning body marking portion 5 includes a second preload member 53. The second preload member 53 is sleeved on the outer wall of the second fastener 52, and is in limiting fit with the end of the second fastener 52 away from the positioning top 1, that is, the scanning body marking portion 5 is fixed to the scanning body positioning portion by the second fastener 52 through the second preload member 53. It should be noted that, in an embodiment, the limiting connection between the second fastener 52 and the second preload member 53 in this embodiment is the same as the limiting connection between the first fastener 2 and the first preload member 3, such that the arrangement of the second preload member 53 also plays a role in preventing rotation when the scanning marking main body 51 is connected to the positioning top 1 by the second fastener 52.

The marking main body 51 is have a structure similar to the scanning body positioning portion, that is, it may be either a separate structure or integrally formed, which is not limited in the disclosure.

By the same reasoning, the marking main body 51 is also include a marking main body base and a marking main body top, such that the second fastener 52 is mounted at the bottom of the marking main body top and is fixed to the side wall of the positioning top, thereby fixing the scanning body marking portion to the positioning top.

It should be understood that the connection between the scanning body marking portion 5 and the scanning body positioning portion may also be a separate mounting or integrally formed, which is not limited in the present disclosure.

In an embodiment, the scanning body marking portion 5 and the positioning top 1 are integrally formed, and are integrally formed of the same material, and the markings are distributed on the surface of the positioning top 1. The markings are distributed on the surfaces of the scanning body marking portion 5 and on the surfaces of the positioning top 1.

In the embodiment of the disclosure, the disclosure further provides a scanning body marking portion 5 with a separate structure, wherein the scanning body positioning portion and the scanning body marking portion 5 are separated into two parts, and the scanning body marking portion 5 is fixed to the scanning body positioning portion by the second fastener 52 along the extending direction of the third inner cavity (i.e. the transverse direction in the figure). This configuration facilitates the use of scanning body positioning portion to be configured with the scanning body marking portion 5 with different lengths and shapes, making it adaptable to various oral environments and suitable for different implant rod spatial positions, thereby meeting the requirements of different scanning scenarios.

In addition, in an embodiment, the scanning body marking portion 5 is made of an aluminum alloy material, and the surface thereof is black, while other components are made of materials with fatigue-resistant properties; and the scanning body marking portion 5 and the scanning body positioning portion are separately assembled by the second fastener, allowing for the use of different materials. Therefore, the scanning body positioning portion does not need to be made of the same material as the scanning body marking portion 5; instead, it is made of a stronger stainless steel material, making it suitable for more adaptable scenarios.

Based on the same inventive concept, the separate connection between the marking main body base and the marking main body top are formed by interference fit, threaded fit or snap fit, which will not be repeated here.

In addition, in the embodiment of the disclosure, the scanning body marking portion is provided with an anti-disengagement structure, and the structural details thereof are as those of the anti-disengagement structure in the scanning body positioning portion of the embodiment of the disclosure, which will not be repeated in the disclosure.

It should be noted that, any of the four core concepts in the disclosure may be selectively combined with other core concepts, or configured independently in the scanning body. For example, for the anti-disengagement structure, it may be included in a separate mounting structure and combined with the separate mounting structure to form a scanning body structure, or it may independently form a scanning body structure independently. This is not limited in the disclosure.

In a most preferred embodiment, the described four concepts of the disclosure are combined in a scanning body structure, such that the scanning body may solve all the technical problems of the related art, which will not be elaborated in the disclosure.

It may be clearly understood by a person skilled in the art that, for the convenience and simplicity of description, division of the foregoing functional units and modules is only used as an example for description. In practical applications, the foregoing functions may be allocated to and implemented by different functional units and modules as required, that is, an internal structure of the apparatus is divided into different functional units or modules to implement all or a part of the functions described in the foregoing. The functional units and modules in the embodiments may be integrated into one processing unit, or each of the units may exist alone physically, or two or more units are integrated into one unit. In addition, specific names of functional units and modules are only intended to distinguish from each other, and are not intended to limit the scope of protection of the disclosure. For a specific working process of the units and modules in the foregoing system, reference may be made to a corresponding process in the foregoing method embodiments, and details are not repeatedly described herein.

In the foregoing embodiments, descriptions of the embodiments are focused on each other, and for a part that is not described or recorded in a certain embodiment, reference may be made to related descriptions of other embodiments.

The units described as separate parts may or may not be physically separate, and parts displayed as units may or may not be physical units, may be located in one position, or may be distributed on a plurality of units. A part or all of the units may be selected according to actual requirements to achieve the objectives of the solutions of the embodiments.

The foregoing embodiments are merely intended to describe the technical solutions of the disclosure rather than limit the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof; These modifications or replacements do not make the essence of the corresponding technical solutions depart from the spirit and scope of the technical solutions of the embodiments of the disclosure, and shall all fall within the scope of protection of the disclosure.

What is claimed is:

1. An intraoral implantation scanning body, comprising:
a scanning body positioning portion,
wherein the scanning body positioning portion is provided with an inner cavity, and a first fastener is provided in the inner cavity;
the first fastener comprises a stopper portion and a fastening portion;
a bottom of the scanning body positioning portion is provided with a mounting hole for the fastening portion to pass through;
the bottom of the scanning body positioning portion is in limiting fit with the stopper portion along an extending direction of the inner cavity;
the fastening portion passes through the mounting hole and is configured for connecting to an implant; and
the inner cavity passes through a top end of the scanning body positioning portion for allowing a user to operate the first fastener;
wherein the scanning body further comprises a scanning body marking portion provided on a top of the scanning body positioning portion and extending laterally outward from the scanning body positioning portion, the scanning body marking portion has an upper surface, and the upper surface is provided with markings at different heights, the scanning body marking portion comprises a marking main body and a second fastener, the marking main body is connected to the positioning top through the second fastener, and the second fastener is in limiting fit with an end of the marking main body near the positioning top; wherein the scanning body marking portion comprises a third inner cavity, and the second fastening member passes through the third inner cavity and is in limiting fit with the positioning top or the scanning body marking portion comprises a second preload member, the second preload member is sleeved on an outer wall of the second fastener, and is in limiting fit with an end of the second fastener away from the positioning top.

2. The scanning body according to claim 1, wherein the scanning body positioning portion is provided with an anti-disengagement structure for preventing the first fastener from falling out of the inner cavity.

3. The scanning body according to claim 2, wherein the anti-disengagement structure comprises a circular protrusion provided on a wall of the inner cavity and protruded inward from the wall of the inner cavity or a plurality of protrusions arranged in a ring shape.

4. The scanning body according to claim 2, wherein the scanning body further comprises an elastic deformation part, the elastic deformation part is arranged at one of the anti-disengagement structure and the first fastener, and the other one of the anti-disengagement structure and the first fastener anti-falling fits with the elastic deformation part.

5. The scanning body according to claim 3, wherein the inner cavity comprises a second inner cavity of the positioning top, the anti-disengagement structure is a protruding circular protrusion, and the protruding circular protrusion is provided at a top of the second inner cavity near the positioning top.

6. The scanning body according to claim 3, wherein the inner cavity comprises a second inner cavity of the positioning top, the anti-disengagement structure is a plurality of protruding points, the plurality of protruding points are arranged at equal intervals around a full circle, and the plurality of protruding points are provided at a top of the second inner cavity near the positioning top.

7. The scanning body according to claim 3, wherein a diameter of the stopper portion is configured to be larger than an inner diameter of the anti-disengagement structure.

8. The scanning body according to claim 1, wherein:
a wall of the inner cavity limits the first fastener along the extending direction of the inner cavity; or
the bottom of the scanning body positioning portion is provided with a limiting hole for limiting fit with the implant.

9. The scanning body according to claim 1, wherein a first preload member is provided between the stopper portion and a bottom end of the scanning body positioning portion, and the first preload member is sleeved on an outer wall of the fastening portion.

10. The scanning body according to claim 9, wherein the first preload member is limited between the stopper portion and the bottom end of the scanning body positioning portion along the extending direction of the inner cavity.

11. The scanning body according to claim 1, wherein:
the scanning body positioning portion comprises a positioning base and a positioning top, and the positioning base and the positioning top are separately connected; or
the positioning base and the positioning top are integrally formed.

12. The scanning body according to claim 11, wherein the positioning base and the positioning top are separately connected, and a separate connection between the positioning base and the positioning top is formed by interference fit, threaded fit, or snap fit; and/or
the separate connection between the positioning base and the positioning top is an irreversible mounting connection.

13. The scanning body according to claim 11, wherein the inner cavity is divided into a first inner cavity of the positioning base and a second inner cavity of the positioning top, wherein the first inner cavity comprises a first fastener accommodating cavity, a mounting hole and a scanning body mounting cavity, a fitting shaft of the positioning base is assembled into the second inner cavity, such that the positioning base is assembled with the positioning top and the first inner cavity is in communication with the second inner cavity to form the inner cavity.

14. The scanning body according to claim 13, wherein an inner diameter of the first fastener accommodating cavity is larger than an inner diameter of the mounting hole, an inner cavity wall of the first fastener accommodating cavity and an inner cavity wall of the mounting hole form a stepped structure, the stopper portion is limited by the stepped structure in the first fastener accommodating cavity and the second cavity.

15. The scanning body according to claim 13, wherein an inner diameter of the scanning body mounting cavity is larger than an inner diameter of the mounting hole, and an inner cavity wall of the scanning body mounting cavity and the inner cavity wall of the mounting hole form a stepped structure, such that the implant is limited in the scanning body mounting cavity by the stepped structure.

16. The scanning body according to claim 11, wherein
the positioning top is subjected to a black surface treatment, and is made of an aluminum alloy material; and/or
the positioning base is made of a stainless steel material; and/or
a hardness of the positioning base is higher than that of the positioning top; and/or
the first fastener is made of a metal material with fatigue-resistant properties.

17. The scanning body according to claim 1, wherein
the upper surface comprises a plurality of upper surfaces, the plurality of upper surfaces being at different heights, or the upper surface is inclined; and/or
the scanning body marking portion has a stepped structure, wherein a step top surface of the stepped structure and a step bottom surface of the stepped structure form the upper surface of the scanning body marking portion, and the markings are provided on the step top surface and the step bottom surface; and/or
the markings comprises marking points.

* * * * *